United States Patent [19]
Le Claire et al.

[11] Patent Number: 5,121,677
[45] Date of Patent: Jun. 16, 1992

[54] PIZZA MAKING AND BAKING MACHINE

[75] Inventors: Harry E. Le Claire; David G. Bligh; Robert W. Kennedy; Julie A. Leson, all of Santa Clara County; Frank Hickman, San Mateo County; Steven S. Frederick, Santa Cruz County, all of Calif.

[73] Assignee: Edible Technology, Inc., Sunnyvale, Calif.

[21] Appl. No.: 347,148

[22] Filed: May 3, 1989

[51] Int. Cl.$^5$ .............................................. A47J 37/00
[52] U.S. Cl. .................... 99/357; 99/443 C; 99/450.1; 83/411.2; 83/411.4; 118/18; 118/25; 141/280; 221/96; 221/150 A; 221/150 HC; 414/798.1
[58] Field of Search .............. 99/352, 355, 357, 386, 99/427, 443 C, 450.1–450.3; 221/96, 112, 289, 298, 150 A, 150 HC; 141/103, 280; 118/16, 18, 24, 25, 110, 308; 222/226, 408.5; 414/798, 798.1; 83/411.2, 411.4

[56] References Cited

U.S. PATENT DOCUMENTS

| | | | |
|---|---|---|---|
| 3,283,955 | 11/1966 | Crabtree | 221/298 |
| 3,358,618 | 12/1967 | Vetta | 99/450.1 |
| 3,631,818 | 1/1972 | Zito | 99/450.1 |
| 3,633,450 | 1/1972 | Grote | 99/450.1 |
| 3,662,677 | 5/1972 | Westling | 99/450.1 |
| 3,735,692 | 5/1973 | Marchignoni | 99/443 C |
| 3,760,715 | 9/1973 | Grote et al. | 99/450.1 |
| 3,780,643 | 12/1973 | Papai | 99/450.1 |
| 3,782,230 | 1/1974 | Bettcher | 83/411.2 |
| 3,908,584 | 9/1975 | Raque | 118/25 |
| 4,112,834 | 9/1978 | Thiry | 99/450.1 |
| 4,145,990 | 3/1979 | Hochandel et al. | 118/25 |
| 4,202,260 | 5/1980 | Weger | 99/450.1 |
| 4,389,562 | 6/1983 | Chaudoir | 99/386 |
| 4,909,412 | 3/1990 | Cerf | 414/798 |

FOREIGN PATENT DOCUMENTS

| | | | |
|---|---|---|---|
| 770463 | 10/1967 | Canada | 221/289 |
| 1916782 | 11/1977 | Fed. Rep. of Germany | 221/298 |
| 2248562 | 5/1975 | France | 221/96 |
| 2485340 | 12/1981 | France | 118/18 |
| 2611465 | 9/1988 | France | 221/150 A |
| 1135530 | 6/1986 | Japan | 99/450.1 |
| 2083872 | 4/1987 | Japan | 99/443 C |

Primary Examiner—Philip R. Coe
Assistant Examiner—Mark Spisich
Attorney, Agent, or Firm—Flehr, Hohbach, Test, Albritton & Herbert

[57] ABSTRACT

A pizza making machine for applying selected ingredients to a pizza crust comprising a number of side-by-side dispensing stations, one station for each of a number of topping ingredients, with each station including means for storing and delivering on command a preselected amount of selected topping ingredient to a crust and means for supporting and sequentially moving the crust under the dispensers so that the topping ingredients are dispensed sequentially on the crust. The custom pizza is then selectively deliverable to a customer uncooked, or to an oven where it is baked in accordance with the selected ingredients and delivered to the customer.

10 Claims, 15 Drawing Sheets

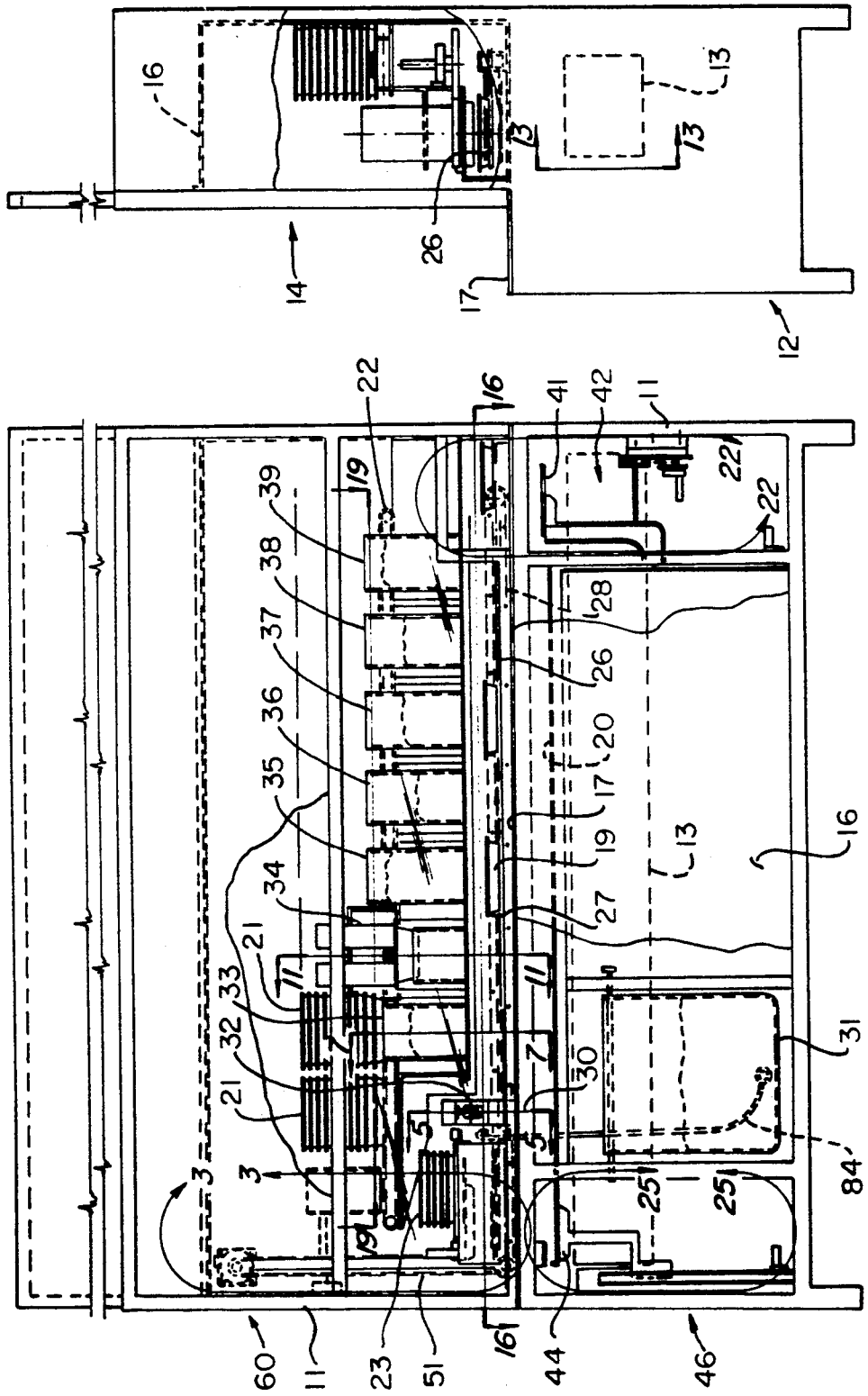

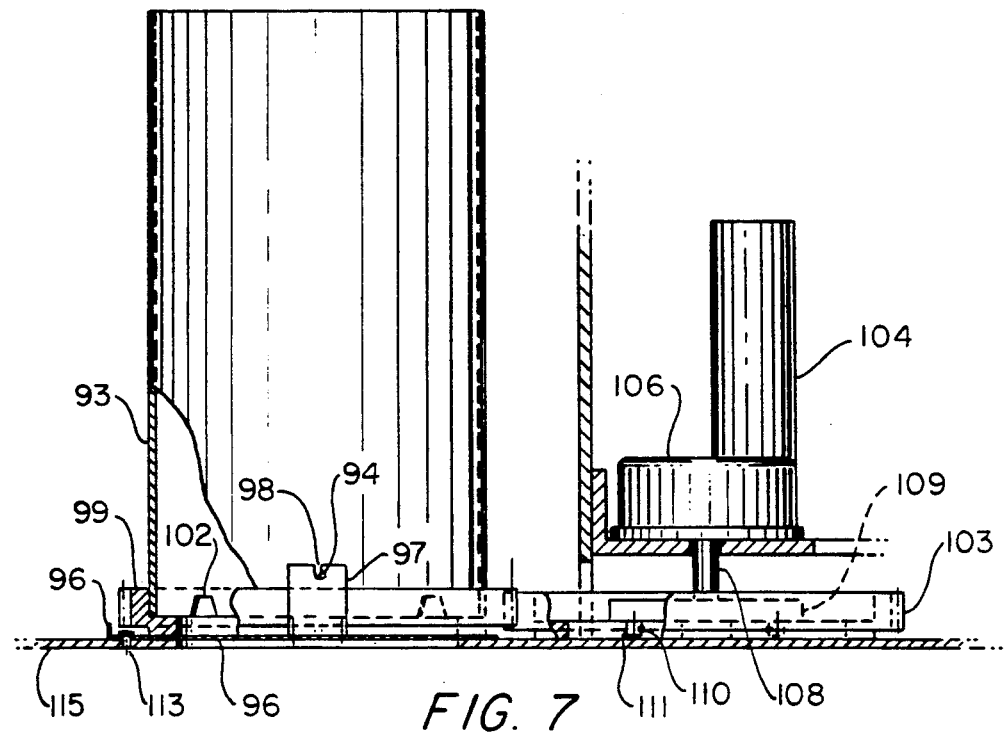
FIG. 7
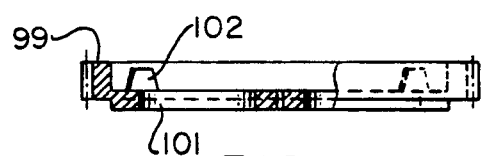
FIG. 8
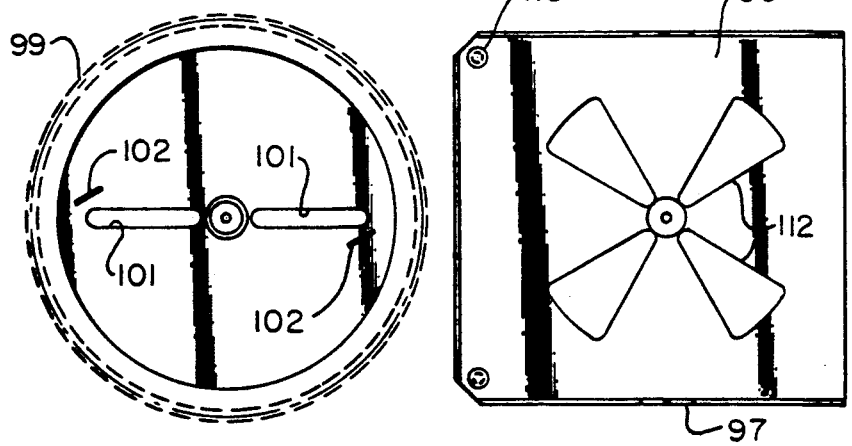
FIG. 9
FIG. 10

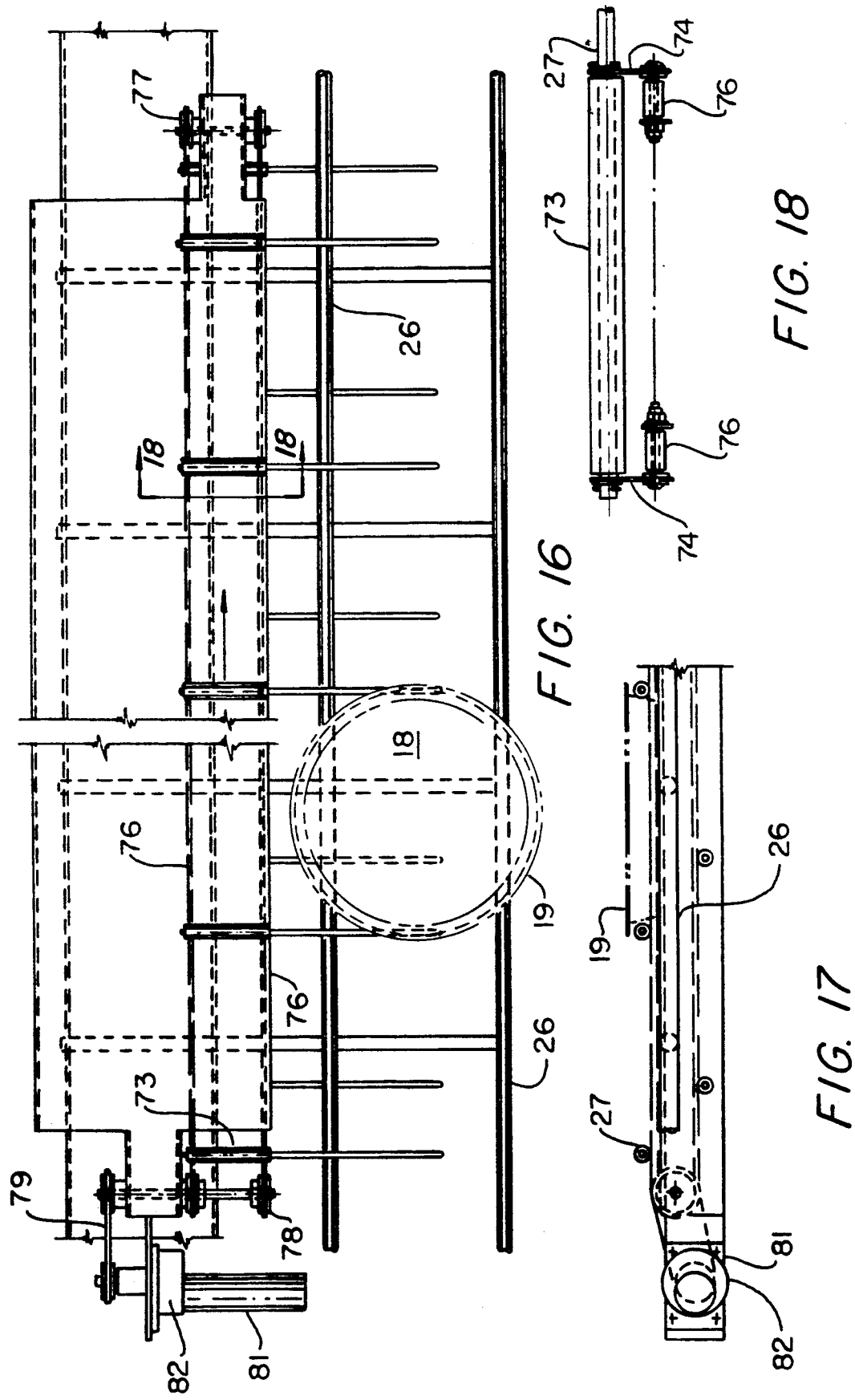

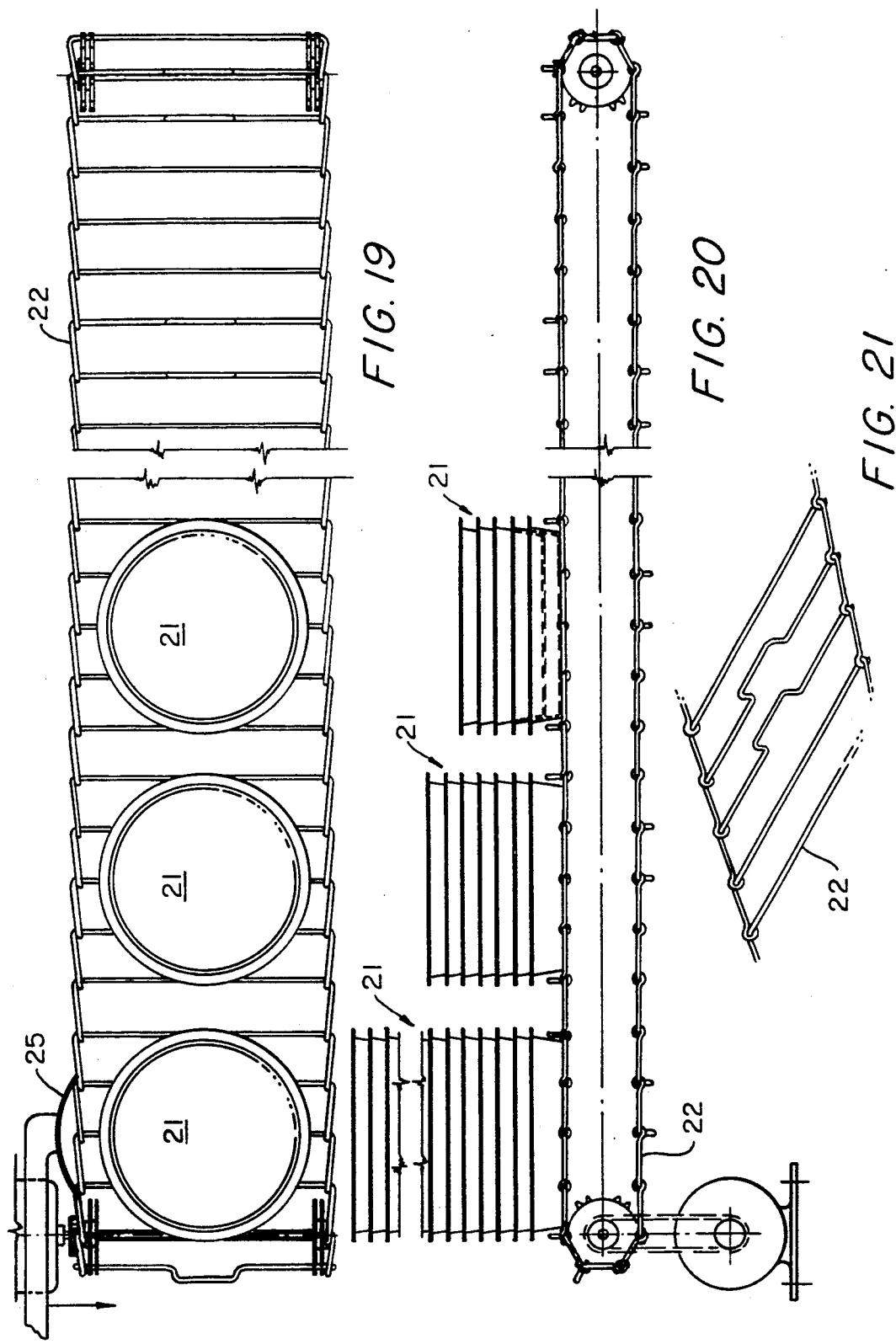

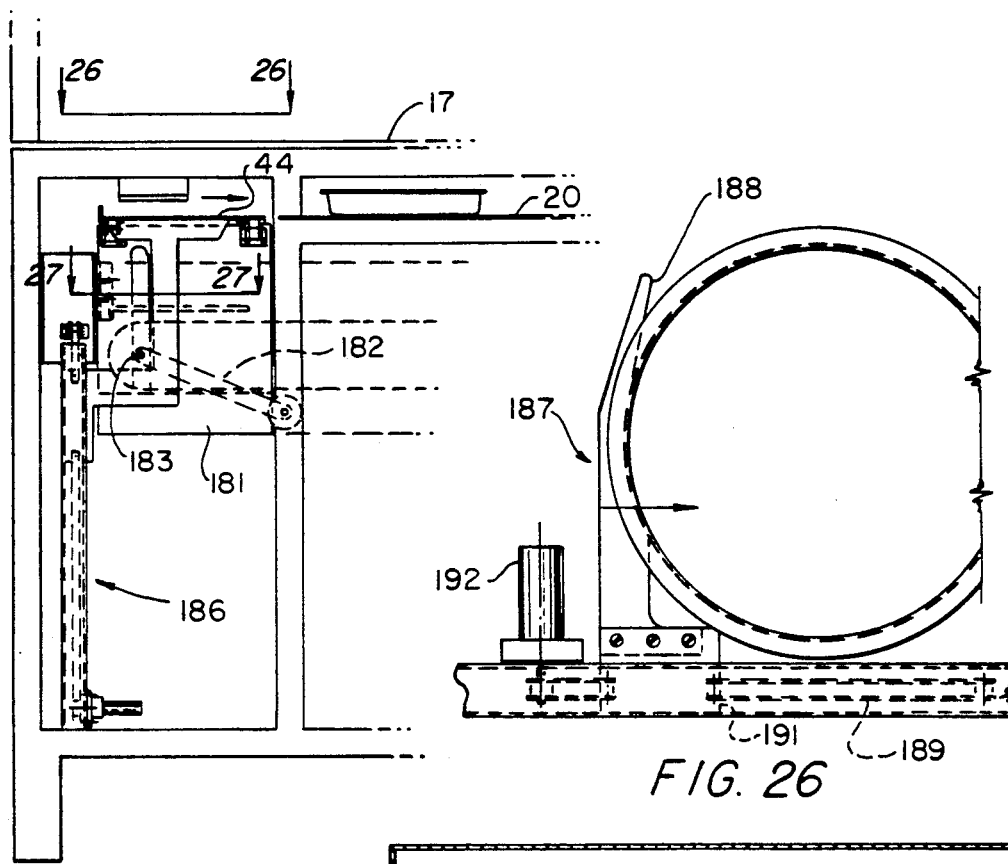
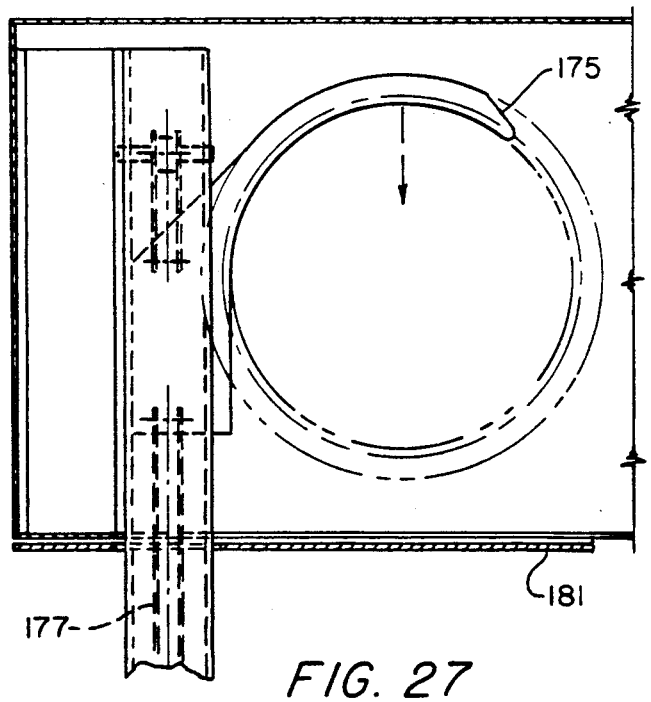
FIG. 25
FIG. 26
FIG. 27

PIZZA MAKING AND BAKING MACHINE

This invention relates generally to a pizza making and baking machine and more particularly to an automated pizza making and baking machine.

Conventionally, pizzas are made by first forming a dough shell or crust, generally round. In some instances the crust is tossed by hand. In others, the crust is rolled or pressed. Pre-made crust is available from various sources and is often used in the making of pizza. In any event, the shell or crust is then coated with a tomato based sauce. Various ingredients including meat products, (sliced sausage, pepperoni, etc.), shredded cheese, (generally mozzarella), and chopped vegetable products (onions, mushrooms, green peppers, olives, etc.), are placed on the shell. The combination is then baked in a hot oven. In common practice, the attendant opens the oven periodically to inspect the pizza to ascertain when it is cooked. This periodic inspection is required because the baking time generally varies with the type and quantity of topping ingredients. A customer may order a simple pizza with cheese and only a few toppings or a pizza with various vegetable and meat ingredients. The cooking time varies with the amount and type of topping.

There is a need for a fully automated, easy to operate, machine which can make and bake custom pizzas with consistently good quality. Such a machine would serve three distinct areas of the prepared food industry: (1) operator assisted vending machines such as might be located in convenience stores; (2) customer operated stand-alone, coin operated vending machine which can be used on campuses, company cafeterias, commissaries, hotels, motels, etc.; and (3) kitchen operated machines which can be controlled by the waiter or cook in the kitchen and the pizza then delivered by the waiter to a customer.

OBJECTS AND SUMMARY OF THE INVENTION

It is a general object of the present invention to provide an automated, self-contained, pizza making machine which will make and bake custom pizza.

It is another object of this invention to provide a pizza making machine which includes a plurality of side-by-side ingredient dispensing stations for applying toppings to a pizza crust moved in cooperation therewith.

It is another object of this invention to provide an improved ingredient dispensing assembly for delivering selected quantities of various ingredients.

It is a further object of this invention to provide a dispensing assembly for slicing and delivering meat products.

It is a further object of this invention to provide a sauce dispensing and spreading assembly.

It is still another object of this invention to provide a pizza making machine in which the ingredients or topping may be preselected by the customer and cooked an amount which is dependent upon the selected toppings.

The foregoing and other objects of this invention are achieved by a pizza making machine for applying selected ingredients to a pizza crust comprising a plurality of side-by-side dispensing stations, one station for each of a plurality of topping ingredients, with each station including means for storing and delivering on command a preselected amount of selected topping ingredient to a crust and means for supporting and sequentially moving the crust under said dispensers whereby the topping ingredients are dispensed sequentially on said crust. The custom pizza then being selectively deliverable to a customer uncooked, or to an oven where it is baked in accordance with the selected ingredients and delivered to the customer.

BRIEF DESCRIPTION OF THE DRAWINGS

The foregoing and other objects of this invention will be more clearly understood from the following description, taken in connection with the accompanying drawings wherein:

FIG. 1 is a front elevational view of a machine in accordance with the preferred embodiment of the invention;

FIG. 2 is a side elevational view of the machine shown in FIG. 1;

FIG. 7 is an enlarged sectional view taken along the line 7—7 of FIG. 1 showing a typical ingredient storage and dispensing station;

FIG. 8 is a view of the drive and dispensing gears used in the storage and dispensing station of FIG. 7;

FIG. 9 is a top view of the ingredient storage and dispensing portion of the storage and dispensing station;

FIG. 10 is a top view of the dispensing plate portion of the storage and dispensing station;

FIG. 16 is a top view of the pan transport means for registering the crust with each of the dispensing stations taken generally along the line 16—16 of FIG. 1;

FIG. 17 is a side elevational view of the drive assembly for the pan transport of FIG. 16;

FIG. 18 is an enlarged view taken along the line 18—18 of FIG. 16;

FIG. 19 is a top plan view of a pan storage and delivery mechanism taken generally along the line 19—19 of FIG. 1;

FIG. 20 is a side elevational view of the mechanism shown in FIG. 19;

FIG. 21 shows the construction of the conveyor used in the delivery mechanism of FIG. 19;

FIG. 25 is an enlarged view of the cooked pizza elevator mechanism for delivering cooked pizza from the oven to a customer taken generally along the line 25—25 of FIG. 1;

FIG. 26 is a view taken generally along the line 26—26 of FIG. 25;

FIG. 27 is a sectional view taken generally along the line 27—27 of FIG. 25;

DESCRIPTION OF THE PREFERRED EMBODIMENT

Figure 4:
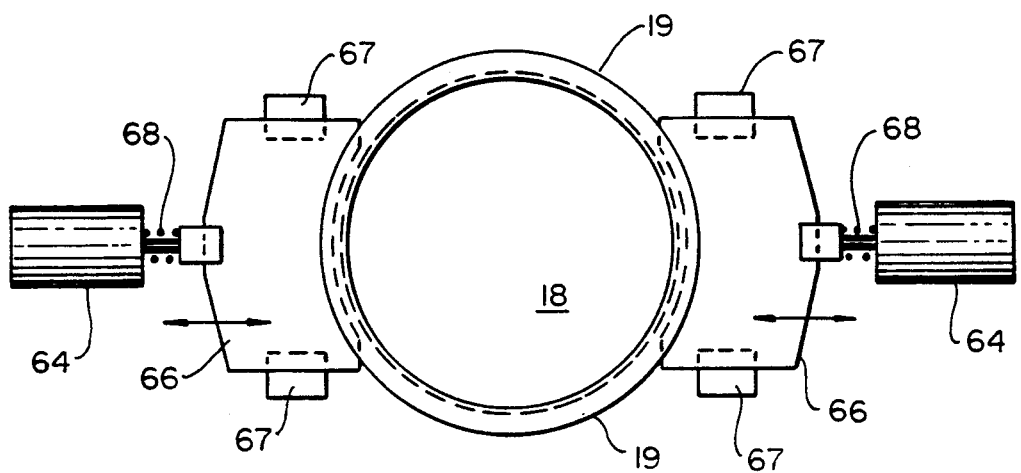
FIG. 4 is a top plan view of FIG. 3 showing the pan support and release mechanism.
Figure 4A:
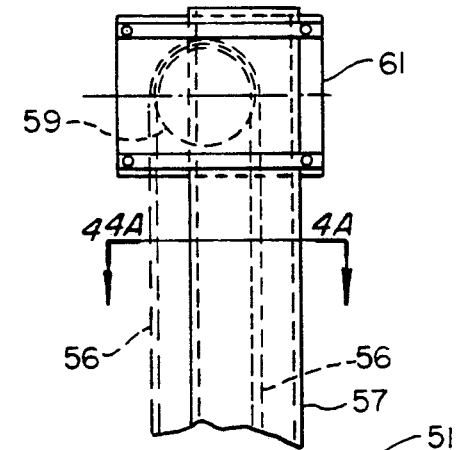
FIG. 4A is a sectional view taken along the line 4A—4A of FIG. 3.

The machine includes a frame 11 made of tubular members. The frame supports the various machine components and mechanisms. The lower frame portion 12 houses the oven 13 shown in dotted line in FIGS. 1 and 2, to be described in detail, oven temperature controls and solid state controls for the oven heater. The upper frame portion 14 accommodates a molded refrigerated case or cabinet 16 shown in dotted line in FIG. 2. The case 16 houses temperature controls, a refrigerator condenser unit, pan dispensing mechanism, ingredient dispensing mechanisms, a pan track and exit mechanism and pan storage and delivery mechanism. At the top of the frame above the cabinet are housed the refrigerator compressor, computer or processor and electric power supplies for providing power for the various machine components. The front of the refrigerator case is closed with a transparent door which is raised to provide access to the refrigerated compartment. The upper frame portion is more shallow than the lower frame portion to form a shelf 17 where the pizzas can be delivered cooked or uncooked as will be presently described, and also provides a working surface for the machine operator.

Figure 3:
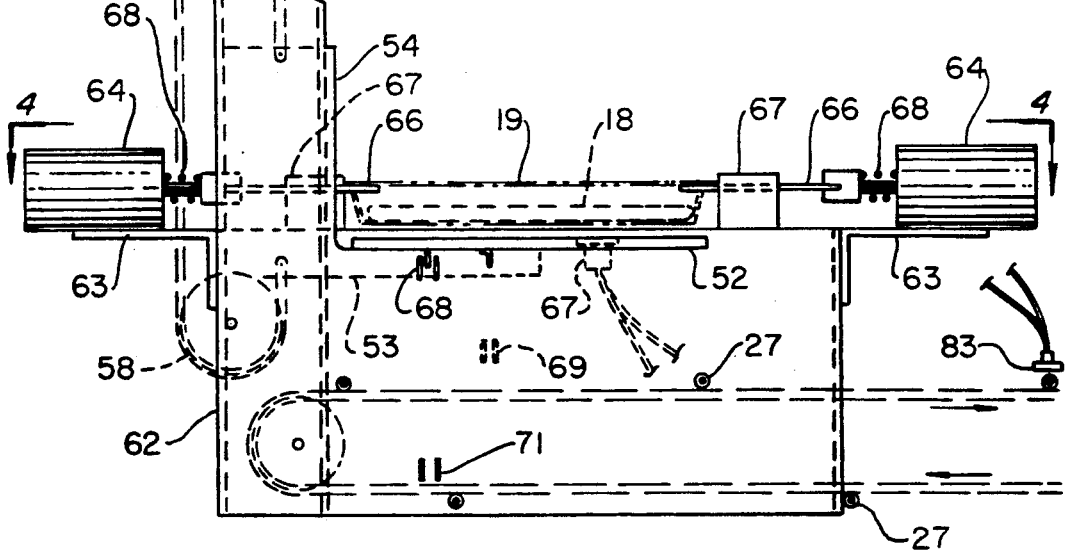
FIG. 3 is an enlarged view of the portion 3—3 of FIG. 1 showing the pan dispensing mechanism.

Briefly, the machine produces pizza having selected ingredients by applying topping to a crust 18, FIGS. 3 and 4, carried in a pan 19.

Referring to FIGS. 1, 19 and 20, a plurality of stacks 21 of pans with crust are stored on a rack or conveyor 22 at the top rear of the refrigerator cabinet where they can be automatically moved to the pan dispensing station 23. At the pan dispensing station one pan at a time is removed from the bottom of the stack 21 and placed onto a support 26 where it is moved along the support by a steel rod 27 carried by a chain 28. Movement of the pan 19 along the support is controlled by a controller which also controls the ingredient dispensing stations whereby a desired amount of selected ingredient is applied to the pizza crust.

The pan and crust dispensed at the pan dispensing station is moved to a first station 30 where a layer of sauce is applied to the crust by the sauce dispenser. A predetermined amount of sauce is fed from a container 31 to the crust and the sauce is thereafter spread evenly on the crust by a roller 32 to be presently described in detail.

The next station 33 is a general dispensing station which in this embodiment dispenses cheese, such as chopped or shredded mozzarella. This station is followed by a meat product dispensing station 34 which provides slices of salami, pepperoni, or the like, as a topping onto crust previously coated with cheese and sauce. This station is followed by a number of vegetable dispensing stations 35, 36, 37, 38 and 39 which may dispense olives, mushrooms, onions, peppers, etc. Thus, there are three types of stations. The sauce spreading station, ingredient spreading station such as 33, 35, 36, 37, 38 and 39 which are identical in construction, and a slicing station 34. As will be presently described, dispensing stations and pan conveyor are computer controlled whereby only ingredients selected by the customer or operator are dispensed. A plurality of pans may be simultaneously moving across the track and the various stations computer controlled, whereby different ingredients are simultaneously applied to different crusts. The in-line pans are advanced after the last dispenser has dispensed its product to the associated crust.

When the pans with filled crusts reach the end of the track a pusher, described below, moves the pan onto the platform 41 of the elevator mechanism 42. The elevator lowers the pan either to the level of the counter top 17, or to the level of the oven entrance, depending on whether the customer wishes to have an uncooked pizza so that he may take it home to bake, or a cooked pizza. The pan is moved into the oven by a pusher mechanism, to be described in detail. The pan is moved through the oven by a conveyor belt and its cooking is computer controlled whereby the cooking of each pizza is individually computer controlled to assure proper cooking. The oven includes a number of controlled independently heated zones whereby the cooking is tailored to the combination selected by the customer.

At the far end, the cooked pizza is pushed out of the oven onto a platform 44 carried by an elevator mechanism 46. The pizza is raised to the cooked delivery shelf at level 20 and pushed onto the shelf where the customer or operator can remove the pizza.

Pan Dispenser

The pan dispenser 23 is shown in more detail in FIGS. 3 and 4. The pan dispenser includes an elevator 51 which moves a pan platform 52 up and down. The pan platform 52 is carried by an arm 53 forming part of a block 54 which is attached to the ends of chain 56 which is housed within a U-shaped housing 57 which supports an idler sprocket 58 at one end and a drive wheel 59 at its other end. The drive wheel 59 is driven by a motor, not shown. Thus, by energizing the motor, the platform 52 may be raised and lowered. The machine includes a number of elevators, all of which are of substantially identical chain-in-tube construction with a follower block guided along an elongated slot 61 formed in the tube.

A welded aluminum frame 62 supports the elevator tube and includes a pair of ledges 63 on which are mounted solenoids 64. The solenoids include blades 66 which ride in spaced slotted guides 67. By energizing the solenoids, the blades are drawn apart and bring the springs 68 in compression. The deenergization of solenoids allows the springs to urge the blades towards one another.

In operation the blades 66 support the rim of the lowermost pan of the stack 21 to support the stack. Each stack may initially include 20 or more crusts and foil pans. To dispense a foil pan the platform 52 is raised upwardly by the elevator to raise the complete stack so that the rim is lifted from the blades 66. The solenoids 64 are then energized, pulling the blades apart. The platform 52 is then lowered by the elevator, approximately one-half inch. The solenoids are deenergized whereby the blades move inwardly between the rim of the bottom pan and the rim of the next pan in the stack. The elevator platform is then lowered so that the blocks support all the pans in the stack except the bottom pan. The elevator platform then continues downward to a lower position placing the pan on the dispenser track whereby the pan can be moved along the track or support 26 by the rod 27. The elevator platform includes a sensor 67 which verifies that a pan is present. The three elevator positions during dispensing are sensed by three sensors 68, 69 and 71 which are disposed alongside the platform. The upper sensor determines stack lifting, the middle sensor 69 positions for re-engagement by the blades 66 and the bottom sensor positions the pan on the track 26. The movement is computer controlled.

When the pan sensor 67 senses no pan has been delivered to the platform, the computer control then determines that the full stack has been dispensed. At this point, the computer causes the elevator to elevate the platform 52 to an upper position where the platform is opposite to the track 22, which supports the plurality of stacks 21 of foil pans and crusts. A push arm 25, FIG. 19, is then energized by the computer to push a stack of pans from the conveyor 22 onto the platform 52. A sensor determines when the conveyor has moved the stack a sufficient distance to place it opposite the platform at which time the conveyor is stopped, the stack delivered, and the elevator lowered until the rim of the lowermost pan engages the blades. The dispensing cycle then commences dispensing one pan at a time as required.

Pan Support and Drive Assembly

Referring to FIGS. 1, 16-18, a pan support and drive assembly is shown. The assembly includes a support 26 which supports the pans for movement below the product dispensers. The pans are moved along the track by stainless steel rods 27 which engage and push the pans along the support 26. The rods 27 are supported at one end in the bushing 73 supported between the spaced members 74 attached to the spaced chains 76. The chains are reeved over idler pulleys 77 at one end and a driven pulley 78 at the other end. The pulley 78 is driven via a belt 79 by a motor 81 through a speed reducer 82. The track position is sensed by a reflective sensor 83, (FIG. 3), which triggers on the stainless steel rods 27. In operation, the pans are moved stepwise along the support in cooperation with the various dispensers. The movement is computer controlled to assure that the proper amount and type of ingredient is dispensed before it moves to the next station.

Sauce Dispenser

Figure 5:
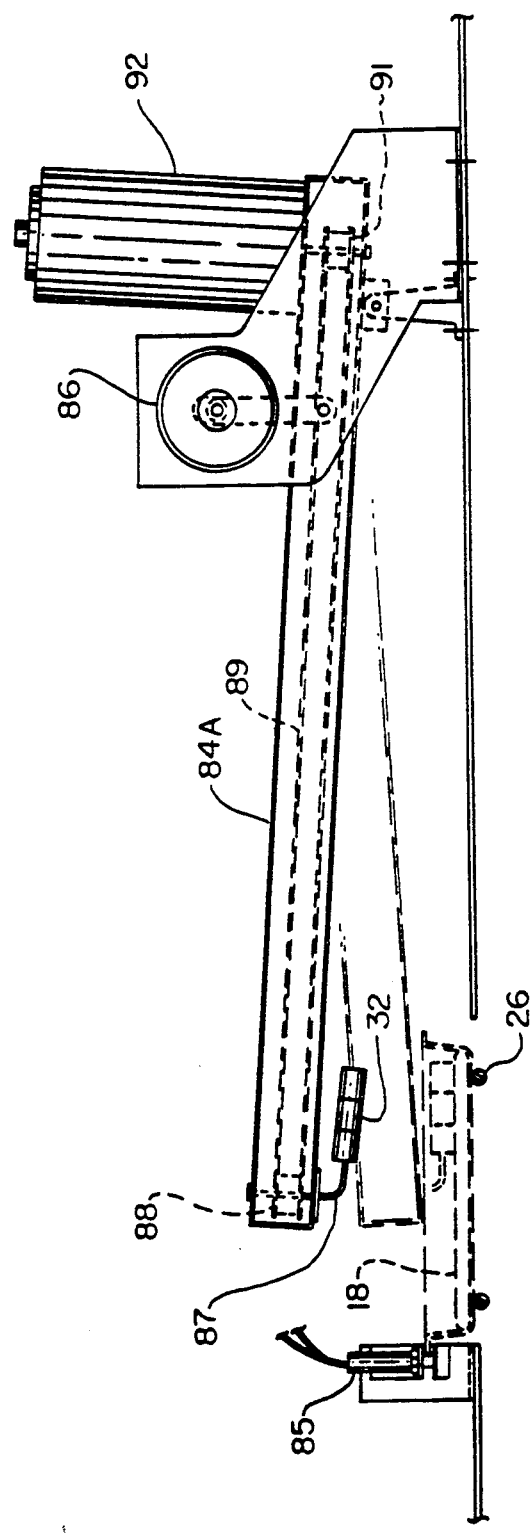
FIG. 5 is an enlarged view taken along 5—5 of FIG. 1 showing the sauce dispensing and spreading station.
Figure 6:
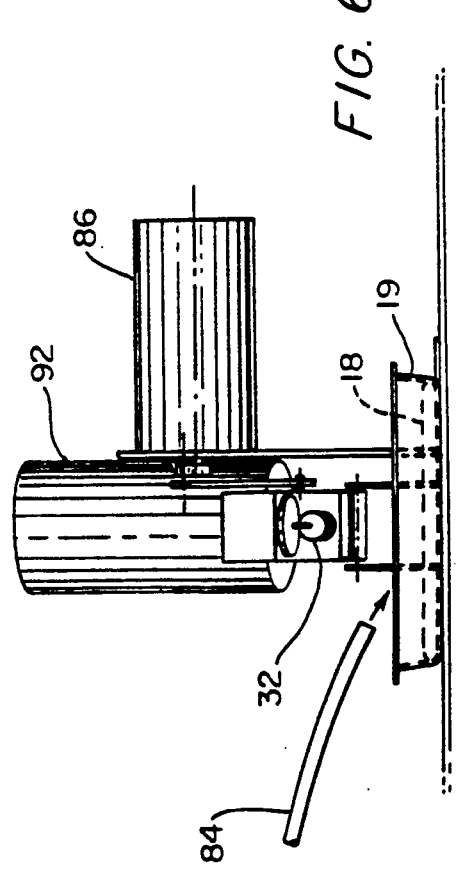
FIG. 6 is a front elevational view of the sauce dispensing station shown in FIG. 5.

After the pan has been dispensed and lowered on the platform 52, it is pushed onto the support 26 where it is moved to the sauce dispenser 30, FIGS. 5 and 6, by a rod 27. At the sauce dispenser, sauce is delivered from a can or a mylar bag such as bag 31 stored in the base of the machine. The sauce is pumped through a tube 84 by a peristaltic pump and dispensed onto the crust. As the pan moves into position a solenoid driven clamp 85 engages the rolled edge of the pan. A spreader roller 32 is suspended over the pizza, FIGS. 1, 5 and 6, which is carried by the arm 87. When the track stops and the pan edge has been engaged, a signal starts the pump to dispense a designated amount of sauce as pre-selected by the customer or operator. The peristaltic pump delivers a predetermined amount of sauce for each revolution and the pump revolutions are computer controlled.

About half-way through the sauce delivery cycle, the motor 86 lowers the arm 84A so that the roller 32 engages the top of the crust as shown in dotted line in FIG. 5. The roller 32 is mounted on an arm 87 driven by idler 88 which is driven by a belt 89. The belt is driven by a drive pulley 91 driven by motor 92. Under computer control the arm is first rotated clockwise and then counter clockwise. After a predetermined number of revolutions of the peristaltic pump to deliver the predetermined amount of sauce, the sauce pump stops, the sauce roller stops, and the solenoid clamp 85 releases the pan, the arm 84A is lifted to bring the roller above the edge of the pan to allow the pan to move along the support 26.

Product Dispenser

The cheese and vegetable dispensers are interchangeable and of identical construction. Thus, the following description of the cheese dispenser 33 shown in detail in FIGS. 7-10, suffices for all dispensers. The product to be dispensed (cheese) is contained in a transparent plastic tube 93. A stainless steel rod 94 extends diametrically across the tube at the lower end. The purpose of the rod is to secure the tube to the bottom stainless steel base plate 96. The stainless steel plate includes upwardly extending tabs 97 which include an L-shaped slot 98 for receiving the ends of the rod 94 and for securing the tube assembly to the base plate 96. As will be described, the rod also serves to break up the food product prior to dispensing.

The bottom of the tube 93 rests in a molded gear 99 which receives the end of the tube and provides a closure with spaced slots 101 and upstanding protrusions 102. The assembly of gear and tube are held on the plate 96 by the rod 94 engaging slots 98. The gear is rotated by an identical drive gear 103 which is driven by motor 104 through a speed reducer 106. The tabs or protrusions 102 on the drive gear 103 cooperate with a photosensor and provide an indication of each half revolution of the molded gear 103. In accordance with the present invention the two gears 99 and 103 are identical in construction. The gear 103 is secured to the drive shaft 108 by a plate 109 including a pair of posts 111, a releasable retainer spring 110 snaps in grooves formed in the post. The gear can easily be replaced. In operation the motor 104 is energized, rotating the gear 103, driving the gear 99 which rotates with relation to the fixed tube 93 and base plate 96 whereby when the slots 101 register with the slots 112 formed in the plate 96 food ingredients are dispensed. The tabs 102 agitate the ingredients and the rod 94 also serves to break up the ingredients as they rotate with the gear 99. The predetermined amount of product is delivered by rotating the gears in one direction for a predetermined number of turns and then in the opposite direction whereas to equalize the dispensing of product. The assembly base plate 96, associated gear 99 and plastic tube 93 can easily be removed from the rack for cleaning and for refill. The assembly is locked or held in the rack by pins 113.

As previously described, a plurality of identical dispensers are used, namely dispensers 33, 35, 36, 37, 38 and 39. The dispensers are identical in construction and operation, and are independently controlled to dispense different ingredients such as cheese, sausage, peppers, mushrooms, pepperoni, onions and olives.

Product Slicer

Figure 12:
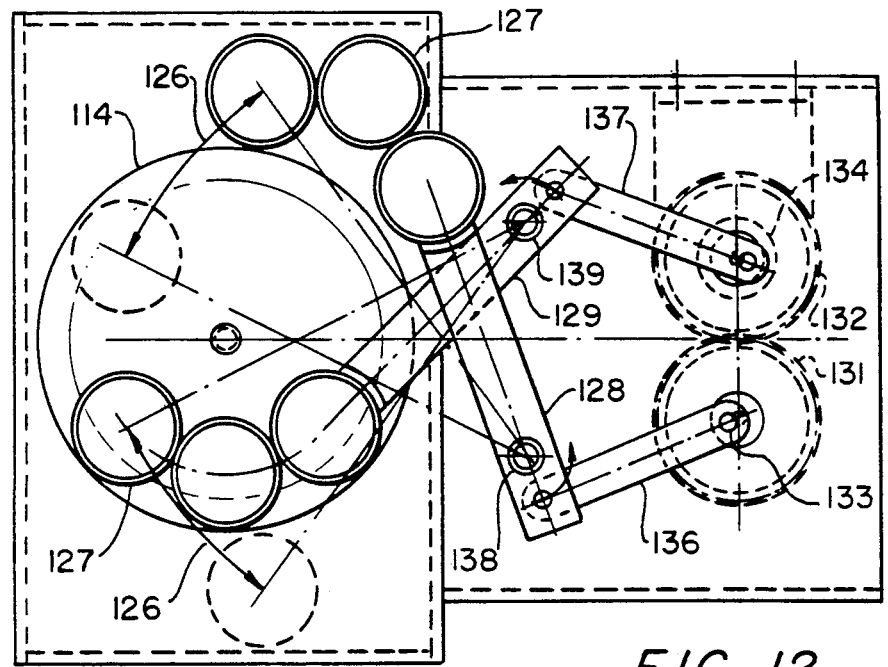
FIG. 12 is an enlarged top elevational view of the meat dispensing station shown in FIG. 11.
Figure 11:
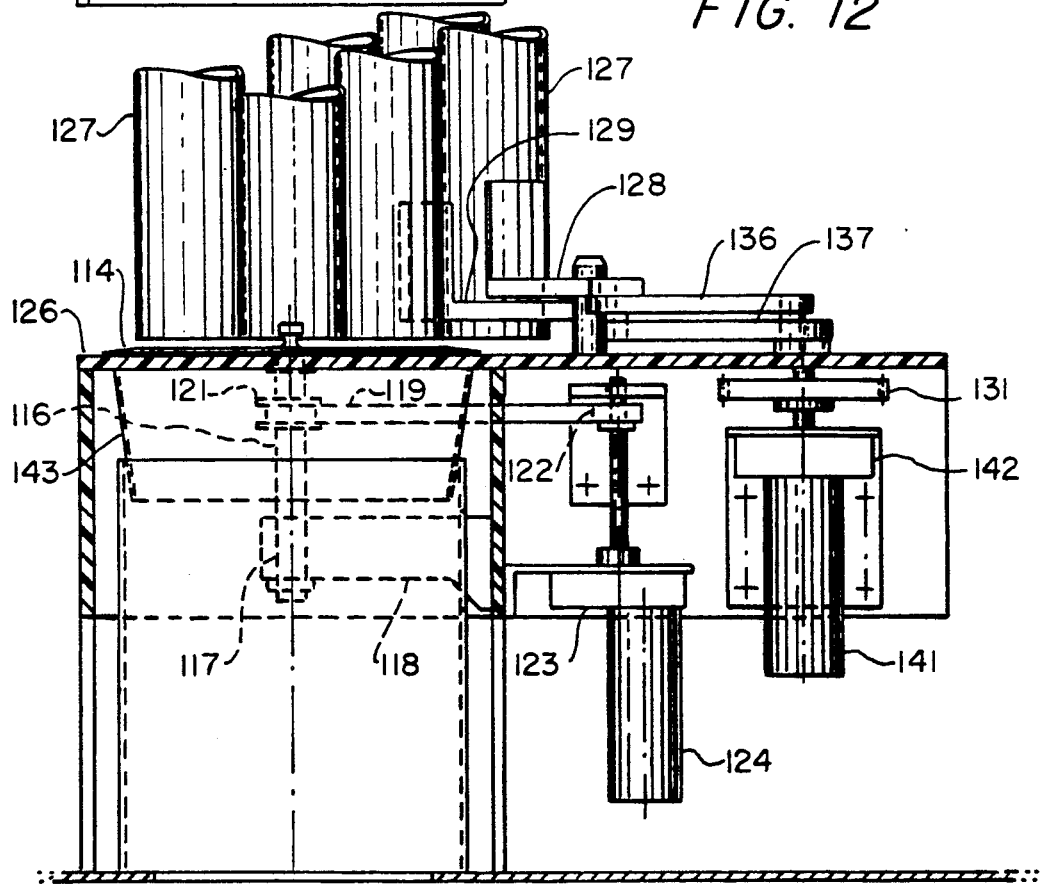
FIG. 11 is a sectional view of the meat dispensing station taken generally along the line 11—11 of FIG. 1.

The product slicer 34 can be used to slice various types of stick type meat products such as salami, pepperoni, Canadian bacon, etc. The slicer is shown in detail in FIGS. 11 and 12, and includes a frame which supports a slicing blade 114 secured to the top of an axle 116 which extends through bearings 117 in support arm 118. The blade is rotated by a belt 119 which is reeved over pulleys 121 and 122 driven through a gear reduction box 123 by motor 124. The blade is positioned slightly above a platform 126. The spacing between the platform and blade determine the thickness of the slices of product.

Two sets of tubes 127 are carried by arms 128 and 129 above the platform 126. The stick product can be inserted in the tubes and is supported on the platform for sliding movement therealong. By moving the arms 128 and 129, the tubes are oscillated, as shown by arrows 126, bringing the product into engagement with the blade to slice the product. The arms 128 and 129 are rotated by gears 131 and 132 having eccentric drives 133 and 134 which drive the arms 136 and 137 to pivot the arms 128 and 129 about the pins 138 and 139. One of the gears is driven by a motor 141 via a gear reducer 142. Thus, energization of the motor 141 moves the arms back and forth, slicing the product.

Just below the rotating blade is a funnel-shaped guide 143, which guides the product onto the pizza and may be provided with product diversion means to spread the product onto the crust as it is leaves the slicer.

General Description of Dispensing Operation

Thus, a pan with crust is moved along the track in cooperation with the various ingredient dispensers in sequence. As shown, the ingredients, in order, are the sauce, cheese, sliced meat products and vegetables. The amount dispensed is selected by the operator or customer.

Oven Module

Figure 13:
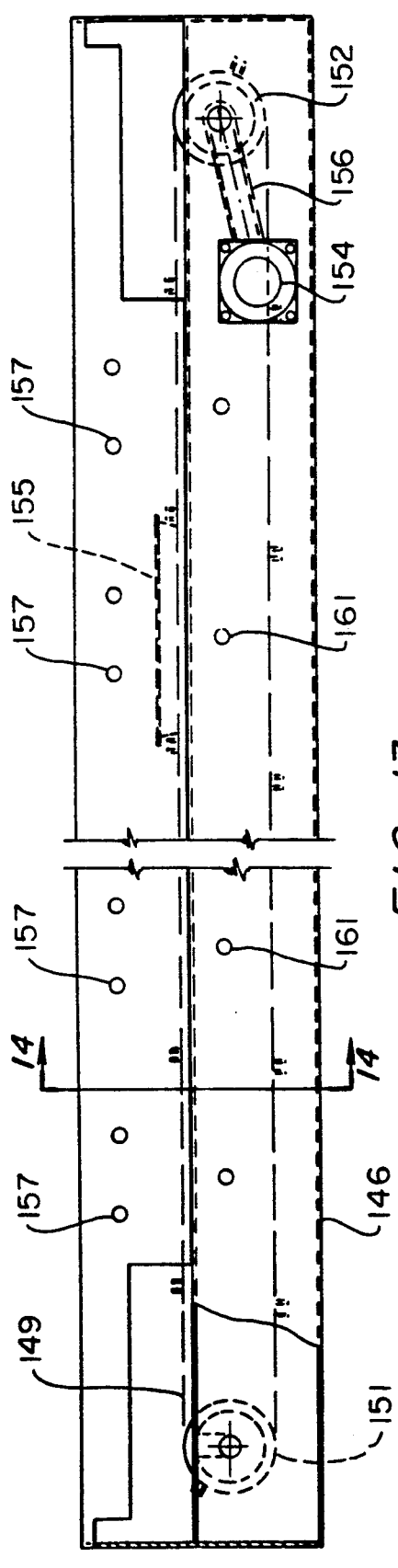
FIG. 13 is a schematic side elevational view of an oven assembly in accordance with the present invention.
Figure 15:
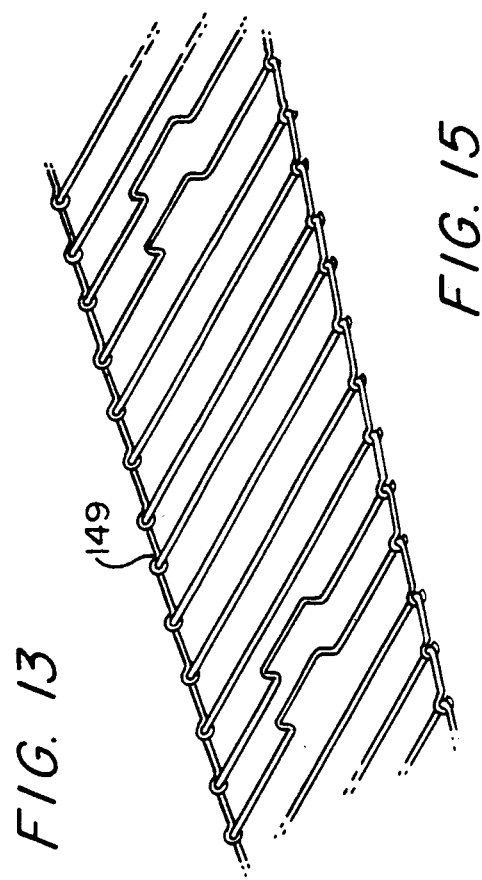
FIG. 15 is a perspective view of an oven pizza transport belt.
Figure 14:
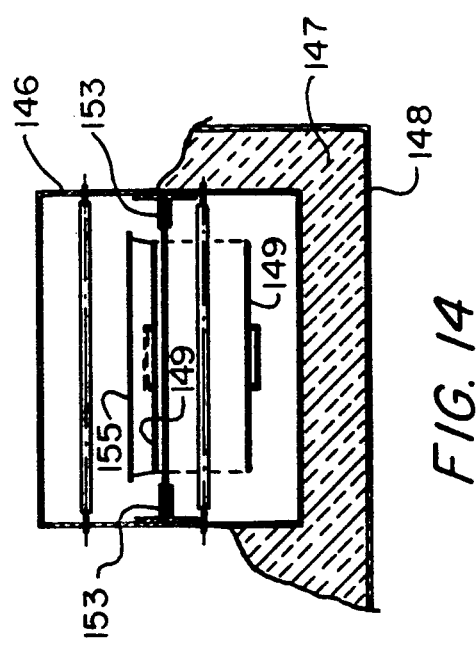
FIG. 14 is a sectional view taken along the line 14—14 of the assembly shown in FIG. 13.

The machine is shown and described with a single oven, however, it will be readily apparent that a second oven can be added. An oven is shown in detail in FIGS. 13-15. The oven comprises an elongated rectangular tube 146 which is insulated with high temperature board insulation 147, as for example, four inches of insulation, with an outside skin of aluminized steel 148. A conveyor track 149 runs almost the entire length of the oven. The conveyor track is a specialized steel grade track designed to withstand the high oven temperatures. The conveyor is reeved over an idler sprocket 151 and a drive sprocket 152 and is supported on its two sides by the ledge 153. A motor 154 drives the chain 156 which drives the drive gear 152. Thus, the motor can be energized to step pans through the oven. As illustrated, a pan 155 is shown beneath the heaters 157. The oven incudes spaced bottom heaters 161 and spaced upper heater pairs 157. The lower heaters are maintained at a substantially constant temperature while the upper heaters have a standby first temperature and may be elevated to a second temperature for programmed heating. Each pair of upper heaters 157 is independently controlled through suitable solid-state switching devices whereby one of two amounts of energy can be applied for cooking purposes. Thus, a pan is sequentially brought into cooperation with the heaters and the heaters controlled to thereby give the desired amount of heat. The heaters are preferably infrared quartz heaters and the pizzas are moved sequentially through the oven to obtain the required amount of heat for a predetermined recipe as will be presently described.

Uncooked Pan Delivery Mechanism

Figure 22:
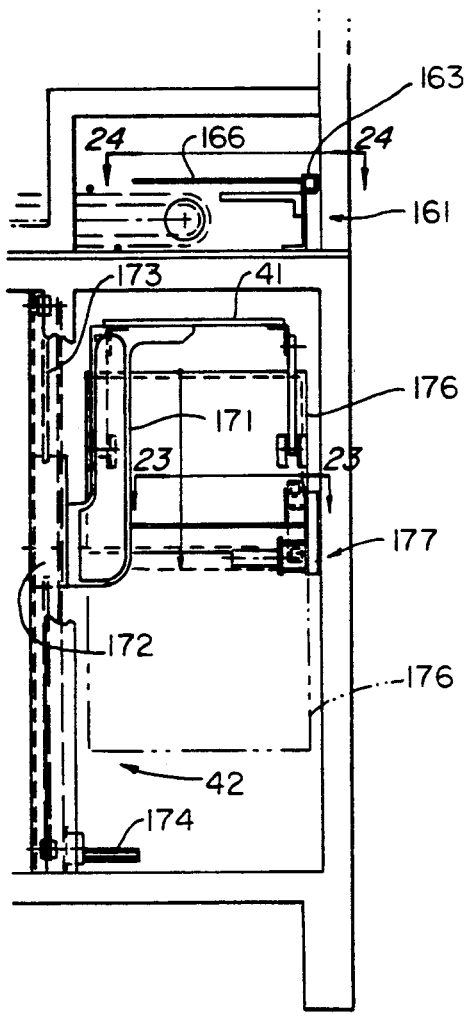
FIG. 22 is an enlarged view of the pizza pan oven delivery mechanism and oven door taken generally along the line 22—22 of FIG. 1.
Figure 24:
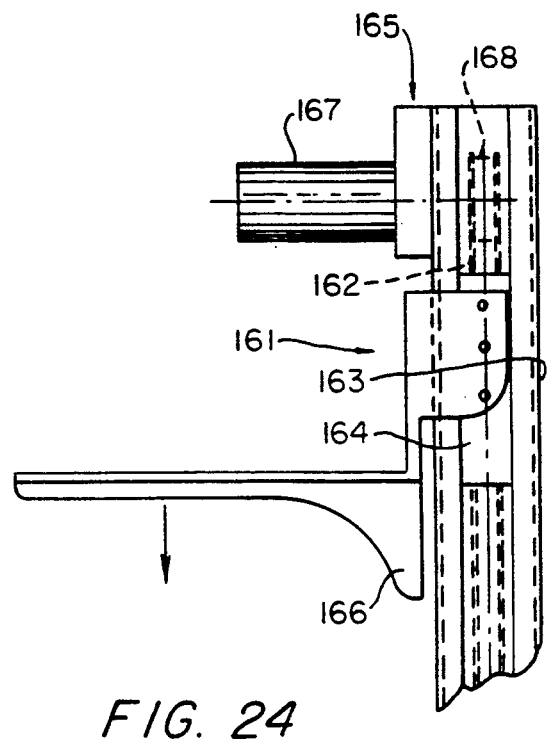
FIG. 24 is a sectional view taken generally along the line 24—24 of FIG. 22.
Figure 23:
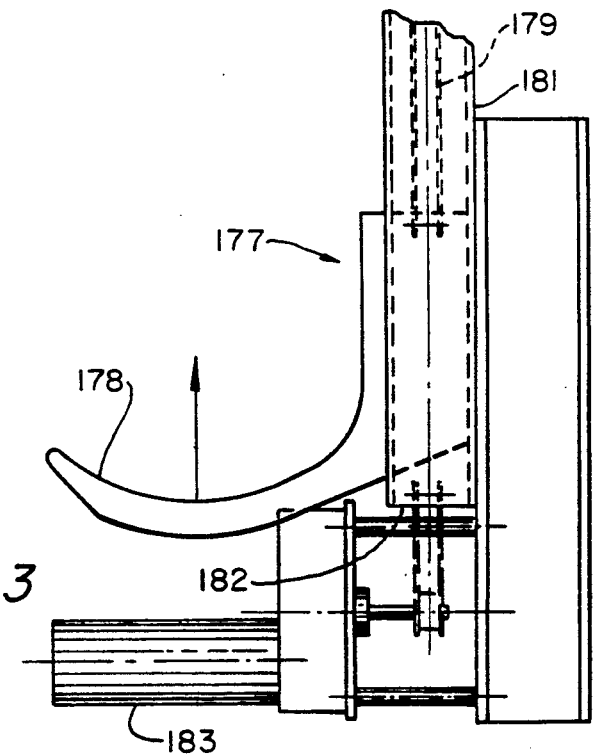
FIG. 23 is a sectional view taken generally along the line 23—23 of FIG. 22.

FIGS. 22-24 show the details of the mechanism which removes the filled pans from the pan support 26 and delivers it uncooked to the customer or to the oven 13. When the pan is cycled from the last dispensing station 39 and advanced one step by the associated pusher rod 27 a pusher assembly 161 pushes the pan outwardly and onto the elevator platform 41. The pusher assembly incudes a drive chain 162 in a tubular member 163 to drive a block 164 which moves a pusher arm 166. The chain is driven by motor assembly 167 and gear reducer 165 which rotates the drive sprocket 168. The pusher assembly is mounted on the frame adjacent to the end of the pan support 26.

The platform 41 is mounted on an arm 171 carried by block 172 driven by motor driven chain 173.

The chain is driven by motor assembly 174. The control program together with position sensors, not shown, moves the elevator to one of three positions: first, fully elevated to receive the pan; second, lowered to be level with the top shelf where a pusher, not shown, can push the pan with uncooked ingredients onto the top shelf; third, to a lower position where the pan can be pushed into the oven onto the conveyor 149. An oven door 176 moves with the elevator whereby when the elevator is in the standby raised position, the door closes the oven opening. When the platform is lowered, the door lowers to the position shown in dotted line and the oven opening is uncovered.

A pusher assembly 177 is located opposite the oven and when the platform with pizza is lowered it is activated so that arm 178 pushes the pizza pan into the oven onto the conveyor belt. The arm 178 is driven by a drive assembly similar to that described in connection with FIG. 24. It incudes a driven chain 179 within tube 181, a block 182, and drive motor 183.

Cooked Pizza Delivery Mechanism

After the pan with the pizza has travelled to the end of the oven, it is removed from the oven by a pusher assembly elevated by an elevator assembly, and delivered to another pusher assembly. These assemblies are of the type previously described in detail, and will be briefly described.

When the cooked pizza is at the end of the oven a pusher arm 175, FIG. 27, is moved by the chain drive 177 driven by a motor, not shown, to push the pan onto the elevator platform 44 which has registered with the chain belt 149. Referring to FIGS. 25 and 27, the oven includes a door 181 which moves with the elevator and platform 44; the door opens when the platform is lowered.

The elevator 186 then raises the platform until it is in a position where the cooked pizza can be delivered. A pusher assembly 187 including arm 188 is mounted to cooperate with the elevator to push the pizza pan onto delivery shelf 20. The pusher assembly includes a chain belt 189, block 191 and motor drive 192.

Entry and Display Panel

Figure 28:
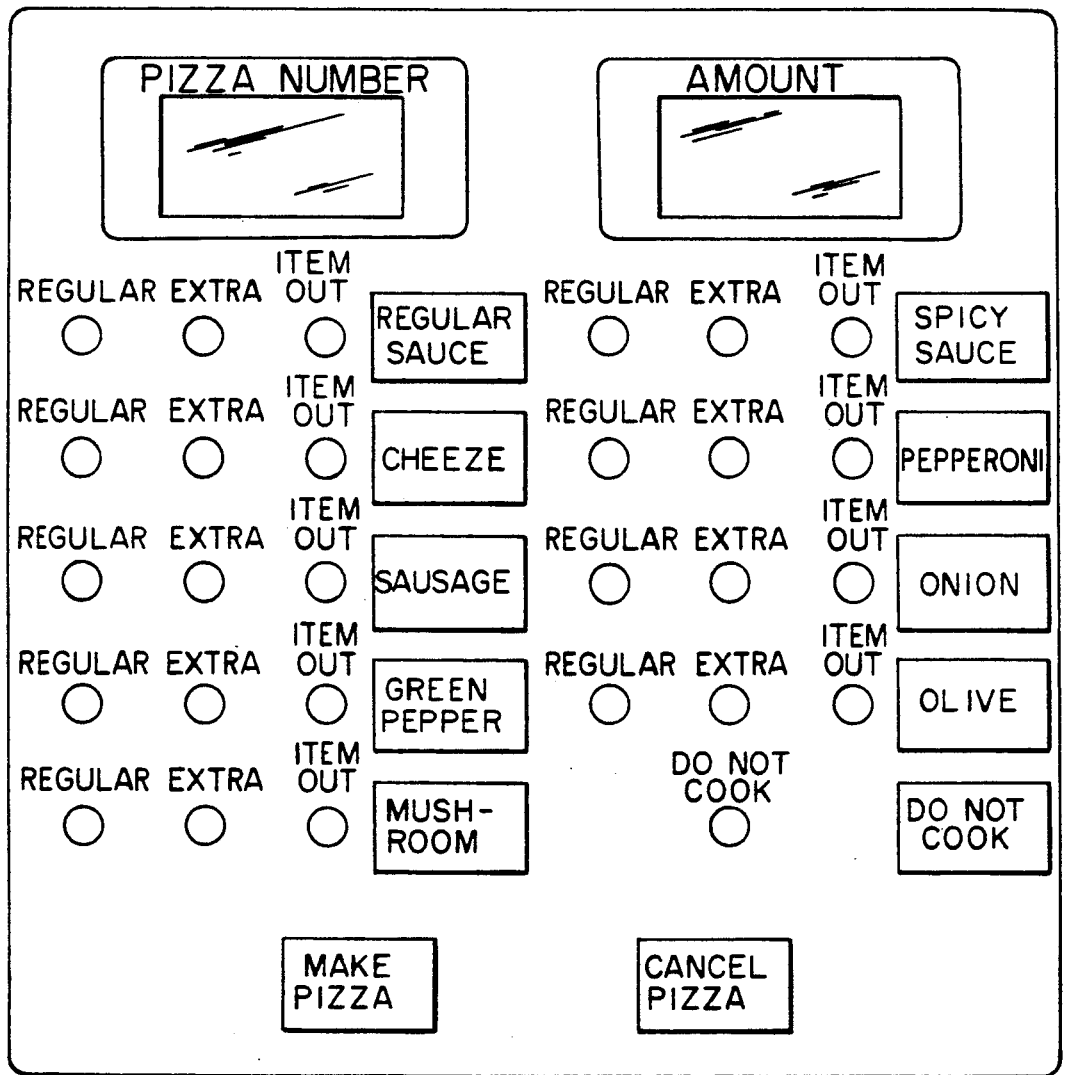
FIG. 28 shows an order entry panel in accordance with one embodiment of the invention.
Figure 29:
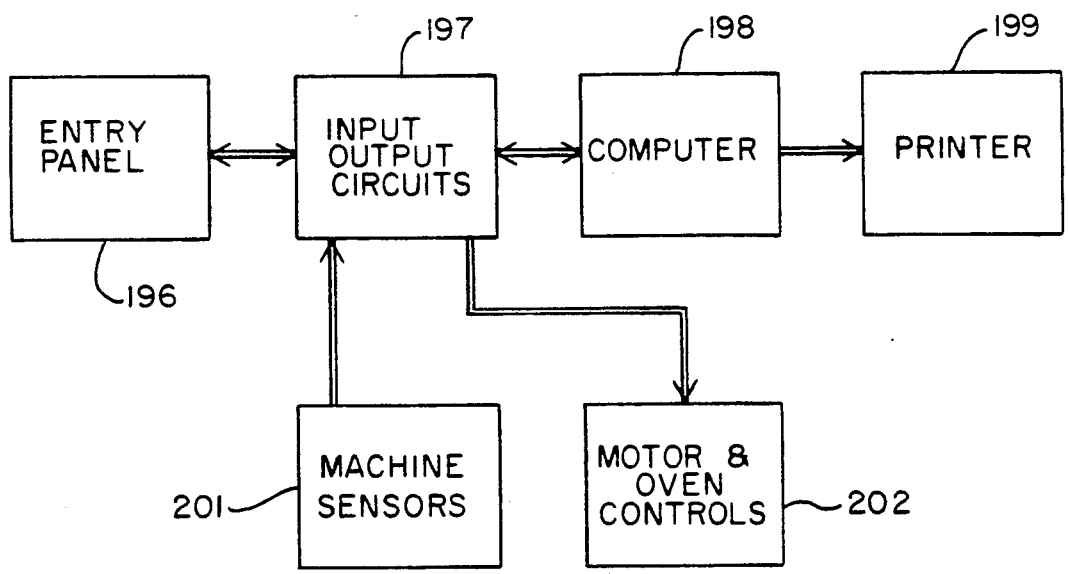
FIG. 29 is a diagram of the electrical controls for the machine.

FIG. 28 shows a suitable entry and display panel 196 where the customer or operator can enter, by depressing keys, the desired combination and quantity of ingredients to be dispensed by the sauce dispensers, product dispensers and product slicers. In the embodiment shown, the customer or operator is given a choice of two sauces which would be supplied from two different storage containers 31; pepperoni, which would be delivered by a product slicer; cheese, sausage, green peppers, mushrooms, and olives from product dispensers. The customer may also select different quantities of each ingredient: regular and extra. If a sensor determines that a product dispenser or slicer is empty, the customer or operator is advised by an "item out" light. When the customer or operator has completed the entry and determined whether or not to cook the pizza, he activates the "make pizza" key. If, during the selection, an error is made, the order can be cancelled.

Control and Operating System

The entry and display panel 196 is connected to input and output circuit 197, which transfers entered information to computer 198. Thus, the recipe selected is entered into a computer memory which memorizes each pizza number and its selected recipe. The computer determines from a pricing table the total price of selected ingredients and displays the price on the panel. The computer may also control a printer 199 which prints the pizza number, description and price.

The computer also receives input from machine sensors 201. As previously described, it receives inputs from four sensors in the pan dispenser, the push rod sensor, the product level sensors, the pan receiving platform sensor, dispensing gear rotation sensor, product delivery elevator sensor, etc.

The computer controls, through the output circuit 197, the various elevator motors, conveyor belt drive motors, pusher arm motors, etc., and the oven heat controls 202. In its control of the oven heaters, the computer consults a look-up table which determines the amount of cooking required and controls the heaters 157.

Overall Operation

Each customer selects his own pizza recipe and depresses the "make pizza" key. If the machine is not busy, a pan is dispensed and sequentially moved through the machine dispensing stations where selected ingredients and quantities are dispensed and then delivered or custom cooked.

On the other hand, the machine may be very busy where a pizza pan is simultaneously under each of the dispensers. The computer remembers the location of each customer's pan and thereby controls the ingredients dispensed at each station. Furthermore, the computer waits until the last ingredient is dispensed before moving the pans under the next dispenser.

The computer tracks each pan through the system and oven whereby it is assured that the selected recipe is delivered for each customer. Furthermore, the computer, by using a look-up table, assures that the pizzas are individually custom cooked by controlling the heaters 157 as each pizza is advanced under the various heating zones.

Figure 30:
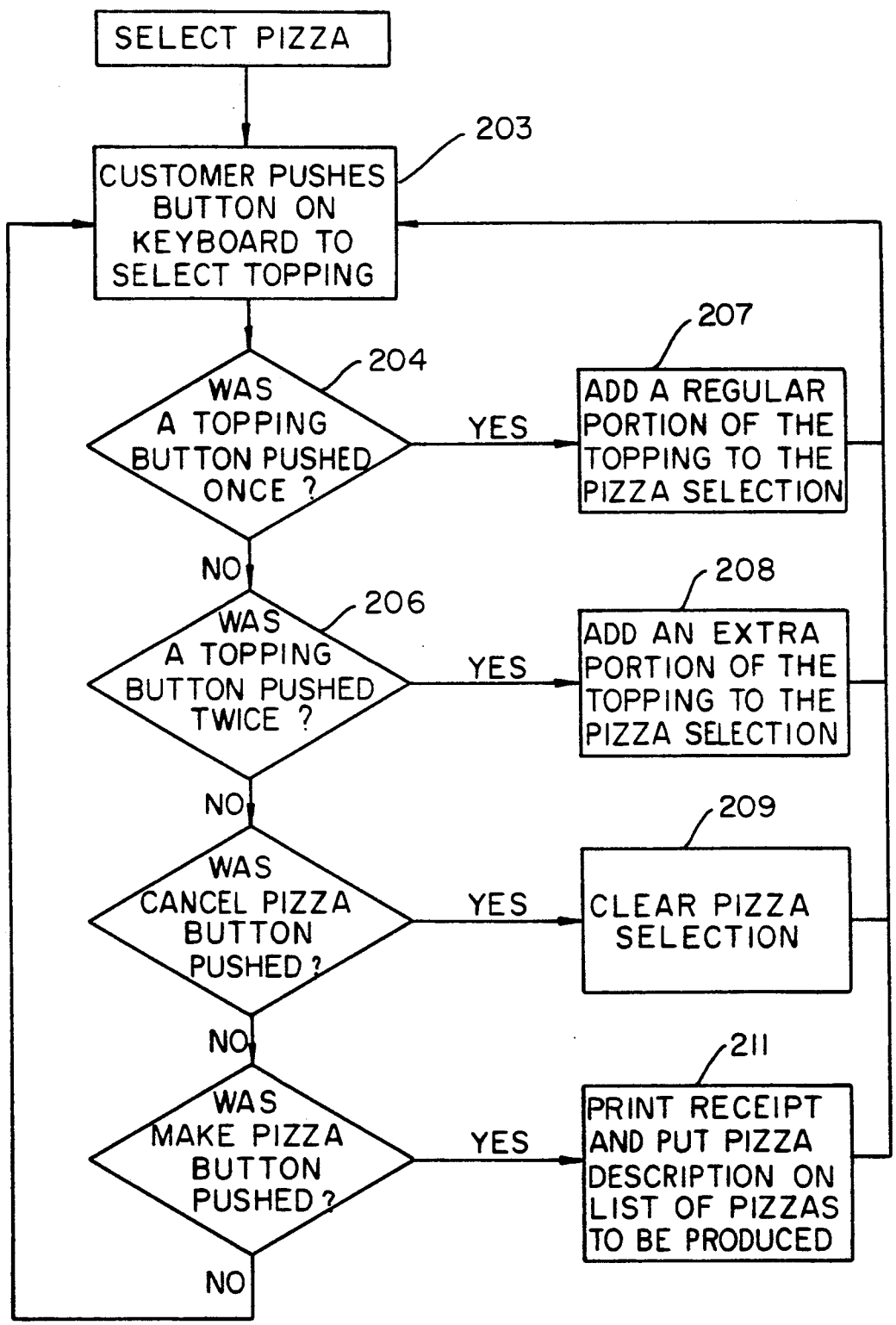
FIG. 30 is a logic flow chart showing the order entry cycle.
Figure 31:
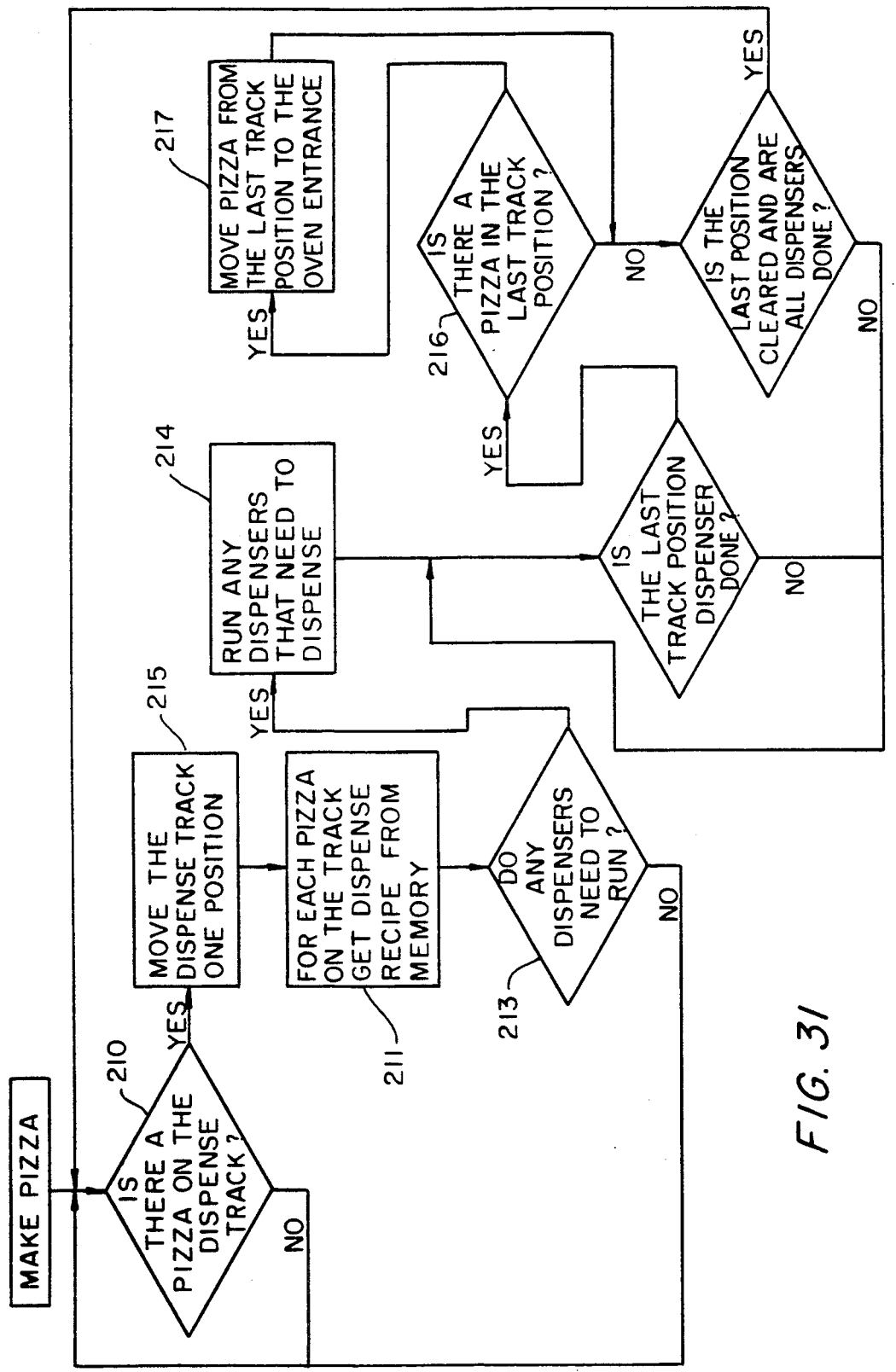
FIG. 31 is a logic flow chart showing the ingredient dispensing cycle.
Figure 32:
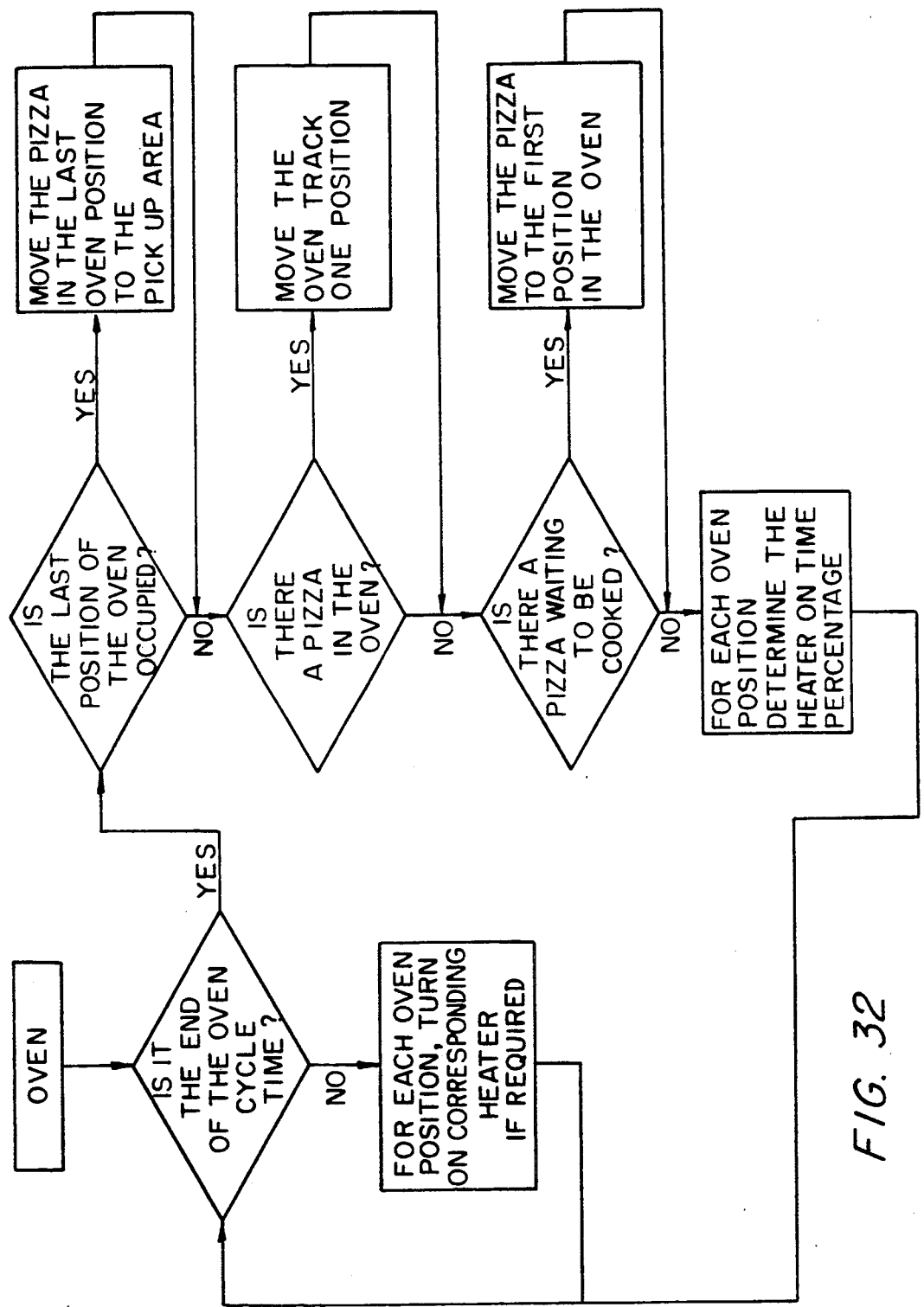
FIG. 32 is a logic flow chart showing the cooking cycle.

FIGS. 30, 31 and 32 are logic diagrams showing the selection of the pizza recipe, the dispenser control cycle and the cooking cycle.

Referring to FIG. 30, the customer or operator depresses keys on the entry panel to select ingredients (toppings) 203. The computer program then determines for each topping whether it is a single amount 204 or extra amount 206, and enters the recipe via 207 or 208. The order can be cancelled, 209. If the order is not cancelled, the "make pizza" key is depressed and the recipe 211 entered in the computer memory. The display and printout identify the pizza number and if space is available on the support 26, a pan is released and placed in the sauce dispenser station.

When the "make pizza" key is depressed, the ingredient dispensing cycle commences, FIG. 31. The first determination is if a pizza pan has been placed on the track 210. If it has, the motor 81 is energized 215 to move the pan to the sauce station 30. The computer obtains from its memory 212 for each pizza pan on the track or support 26, the recipe and then controls the dispensing motors at each station as the pan moves thereunder to dispense the selected ingredient and amount. This is shown at 213 and 214.

The program determines if a pan is at the last position 214 and then moves the pizza pan to either the oven or delivery of an uncooked pizza 217.

The program controls the oven as shown in FIG. 32 to assure delivery of cooked pizzas to the customer. A cooked pizza at the end of the oven is pushed onto the elevator platform 44. If there are pans in the oven, the conveyor belt is advanced to bring the pans under the next heating zone or station. If a pizza pan is waiting, it is then moved into the oven.

Thus, there has been provided a pizza making and baking machine which can be controlled by a customer or operator to make pizzas with custom selected ingredients and cooked in accordance with the ingredients selected.

What is claimed is:

1. A pizza making machine for applying selected ingredients to a pizza crust, comprising:
   (A) a plurality of side-by-side dispensers, one dispenser for each of a plurality of selectable pizza topping ingredients, each dispenser including
      (i) a storage bin, including a top and a bottom;
      (ii) aperture means at the bottom of the storage bin for retaining ingredients in the bin, the aperture means including;
         (a) a plate having a plurality of elongated apertures;
         (b) a rotatably mounted member, positioned above said plate, having a plurality of elongated slots, and tabs perpendicularly disposed to the elongated slots, whereby the rotatably mounted member and the plate can be moved relative to one another thereby forcing the tabs to agitate the ingredients in the storage bins and move the ingredients toward the elongated slots, thereby allowing the ingredients to fall through the elongated apertures when the apertures and slots are aligned;
   (B) means for supporting and sequentially moving the crust under said dispensers;
   (C) means for selectively delivering the ingredients to individual crusts positioned beneath said dispensers, said means including means for selecting the amount of ingredient to deliver to said individual crusts;

(D) means for storing a plurality of crusts;

(E) means for selectively delivering one crust at a time onto said supporting means; and (F) refrigeration means for said dispensers, said refrigeration means positioned above said support means, an oven positioned beneath said refrigeration means, and vertical movement means for delivering a crust from said supporting means to said oven, said vertical movement means includes an elevator including a platform and means for moving said platform between a first position adjacent to said supporting means and a second position adjacent to said oven and means for moving said crust onto said platform and means for moving said crust from said platform into said oven.

2. A pizza making machine for applying selected ingredients to a pizza crust, comprising:

(A) a plurality of side-by-side dispensers, one dispenser for each of a plurality of selectable pizza topping ingredients, each dispenser including (i) a storage bin, including a top and a bottom;

(ii) aperture means at the bottom of the storage bin for retaining ingredients in the bin, the aperture means including;

(a) a plate having a plurality of elongated apertures;

(b) a rotatably mounted member, positioned above said plate, having a plurality of elongated slots, and tabs perpendicularly disposed to the elongated slots, whereby the rotatably mounted member and the plate can be moved relative to one another thereby forcing the tabs to agitate the ingredients in the storage bins and move the ingredients toward the elongated slots, thereby allowing the ingredients to fall through the elongated apertures when the apertures and slots are aligned;

(B) means for supporting and sequentially moving the crust under said dispensers;

(C) means for selectively delivering the ingredients to individual crusts positioned beneath said dispensers, said means including means for selecting the amount of ingredient to deliver to said individual crusts;

(D) means for storing a plurality of crusts;

(E) means for selectively delivering one crust at a time onto said supporting means; and (F) refrigeration means for said dispensers, said refrigeration means positioned above said support means, an oven positioned beneath said refrigeration means, and vertical movement means for delivering a crust from said support means to said oven;

(G) conveyor means extending along said oven to transport filled crusts along said oven;

(H) a plurality of groups of heaters disposed along said oven whereby said conveyor can move a filled crust sequentially into cooperation with said groups of heaters; and (I) means for individually controlling selected heaters in each group for selectively cooking said filled crust depending upon the number and the types of the ingredients on the crust.

3. A pizza making machine as in claim 2 including a vertically movable elevator including a platform adjacent the end of said oven and independent means for moving a cooked pizza from said oven conveyor onto said platform when the platform is adjacent to said oven.

4. A pizza making machine as in claim 3 wherein said elevator moves a cooked pizza from said oven to a pizza delivery level.

5. A pizza making machine for applying selected ingredients to a pizza crust carried in a pan, comprising:

(A) a plurality of side-by-side dispensing stations, one station for each of a plurality of selectable pizza topping ingredients, said stations each including means for delivering, on command, a selected topping ingredient to the crust;

(B) means for supporting and sequentially moving the pan and crust under said dispensers whereby ingredients are dispensed onto said crust;

(C) means for storing a plurality of discrete stacks, each stack including a plurality of pans with crusts, said pans including a lip;

(D) support means to support the stack, said means engaging the lip of the bottom pan of the stack;

(E) means for selectively delivering the pans one at a time, said means including:

(i) an elevator for lifting the stack;

(ii) means for releasing the support means;

(iii) means for lowering the elevator and stack until the lip of the lower pan travels past the support means and then engaging the lip of the next pan to hold the stack as the lower pan is delivered;

(F) means for sensing when the last pan in the stack has been delivered;

(G) means for storing a plurality of said stacks of pans with crusts; and (H) means for moving said elevator to a stack receiving position responsive to sensing of the delivery of the last pan and means for delivering a stack of pans from said plurality of stacks to said elevator and lowering the elevator to engage the bottom pan with the stack support means.

6. A pizza making machine as in claim 5 wherein said plurality of stacks are supported on a conveyor for delivery to said means for selectively delivering pans.

7. A pizza making machine for applying selected ingredients to a pizza crust comprising:

(A) a plurality of side-by-side dispensing stations, one station for each of a plurality of selectable pizza topping ingredients, said stations disposed within a refrigeration unit and including:

(i) a first station for delivering sauce from a sauce container to said crust and for spreading said sauce evenly on said crust;

(ii) a plurality of second stations, each including means for selectively and variably delivering a topping ingredient to the crust;

(B) an oven for variably cooking each pizza crust dependent upon the number of the ingredients and the amount of the ingredients;

(C) means for sequentially moving the crusts from under the stations, to the oven, and to a delivery point;

(D) a recipe entry panel associated with control means for controlling: the amount of ingredients delivered to said crust at each of said stations; and (E) means responsive to said entry panel for controlling the oven so that the amount of oven heat applied to each pizza is dependent upon the number of the ingredients and the amount of the ingredients.

8. A pizza making machine as in claim 7 in which said second station dispensers include
(A) a storage bin including a top and a bottom;
(B) aperture means at the bottom of said storage bin for retaining ingredients in the bin, said aperture means including
  (i) a plate having a plurality of elongated apertures;
  (ii) a rotatably mounted member positioned above said plate having a plurality of elongated slots, and tabs perpendicularly disposed to the elongated sots, whereby the rotatably mounted member and the plate can be moved relative to one another thereby forcing the tabs to agitate the ingredients in the storage bins and move the ingredients toward the elongated slots, thereby allowing the ingredients to fall through the elongated apertures when the apertures and slots are aligned.

9. A pizza making machine as in claim 7 in which said oven includes a plurality of groups of heaters disposed therealong and a conveyor beneath said heaters whereby said conveyor can move a crust sequentially into cooperation with said groups of heaters.

10. A pizza making machine as in claim 9 including means in said control means for controlling selected heaters in each group to cook said pizza according to a receipe selected by an individual.

* * * * *